US006996807B1

(12) United States Patent
Vardi et al.

(10) Patent No.: US 6,996,807 B1
(45) Date of Patent: Feb. 7, 2006

(54) CONSOLIDATION AND REDUCTION OF USAGE DATA

(75) Inventors: David Vardi, New York, NY (US); Per Hellberg, New York, NY (US); Robert Barritz, New York, NY (US); Gerald Cohen, New York, NY (US)

(73) Assignee: Isogon Corporation, New York, NY (US)

( * ) Notice: Subject to any disclaimer, the term of this patent is extended or adjusted under 35 U.S.C. 154(b) by 851 days.

(21) Appl. No.: 09/722,936

(22) Filed: Nov. 27, 2000

Related U.S. Application Data

(60) Provisional application No. 60/178,963, filed on Feb. 1, 2000.

(51) Int. Cl.
*G06F 9/44* (2006.01)

(52) U.S. Cl. ............... 717/127; 717/102; 717/107; 717/131

(58) Field of Classification Search ........... 717/127, 717/131, 124, 120, 128, 101, 102, 107; 714/47, 714/4; 700/104; 709/205
See application file for complete search history.

(56) References Cited

U.S. PATENT DOCUMENTS

| 5,379,406 A | 1/1995 | Wade |
| 5,499,340 A | 3/1996 | Barritz |

*Primary Examiner*—Chameli C. Das
(74) *Attorney, Agent, or Firm*—Ostrolenk, Faber, Gerb & Soffen, LLP

(57) ABSTRACT

A software monitoring and auditing system which determines the inventory of software products on a computer includes data reducer software which processes detailed software usage data gathered by a monitoring component of the software to create a condensed usage database. The reducer software contemporaneously converts the data records in a manner which reduces the amount of data records by at least a factor of 100, consuming less computer memory and allowing users of the software monitoring and auditing system to review usage data on a desktop PC or the like.

46 Claims, 3 Drawing Sheets

CONSOLIDATION AND REDUCTION OF USAGE DATA

RELATED APPLICATION

This Application claims priority and is entitled to the filing date of U.S. Provisional Application Ser. No. 60/178,963 filed Feb. 1, 2000, and entitled "CONSOLIDATION AND REDUCTION OF USAGE DATA."

BACKGROUND OF THE INVENTION

The present invention relates to a system for determining the software inventory and usage on a computer and, more particularly, to a system and method for consolidating and reducing software usage data to evolve information about software inventory as well as usage.

A software monitoring and auditing system (SMAS) is used to first determine the inventory of software products (including relevant identifying information) and their component modules that are installed on one or more computer systems or a complex or Sysplex of such systems. Secondly, an SMAS is used to determine the modules, products, and versions and releases of products that are actually being used. An SMAS (such as Isogon's, the present Assignee's, SoftAudit product) is typically used in large computing environments, such as mainframes, and must gather and process vast amounts of data. Aspects of Isogon's SoftAudit product are described in U.S. Pat. No. 5,499,340, the contents of which are incorporated by reference herein.

A typical mainframe computer might have 500 products, composed of 500,000 modules on 3,000 libraries, often with many of the products duplicated on a number of libraries. As such, inventory data, consisting of a record for every module installed on every library on the computer system, will often times reflect half a million to several million modules.

Such computing environments are not static. Inventories must be redone periodically, perhaps weekly or monthly, to detect changes, such as new modules or deleted modules. Often, rather than the most current inventory data replacing all prior data, it must be kept in addition to all prior data in order to accurately reflect inventory over time.

Usage data is typically gathered by use of a monitoring program designed specifically for that task, by a capability inherently included within the operating system, or a combination of both. Collectively, this process is called the Monitor. The data consists of information reflecting the execution of some or every module in the system. Such data may include the module name, the library or directory it resides on, date and time of use, the process (such as job step) using the module, the user ID associated with that process, and so on. In some instances, the Monitor may construct a fingerprint, pattern, calculation, or other module analysis that results in a characteristic of the executing module that can be used to identify that module when correlated to similar data contained within the module inventory. In mainframe systems, many millions of modules may be executed each day, and it is usually desirable or necessary to retain the usage data pertaining to an extended time period, for example the most recent three or six months.

An SMAS typically processes the inventory data using predetermined rules and heuristics against a knowledge base (KB) 10 that correlates identifying module characteristics of software modules 12a, 12b . . . 12n with software products 14a, 14b (FIG. 1) in order to determine the software product (and optionally the version and release of that product) that each module belongs to. Module characteristics may include the module name, fingerprint, pattern, calculation, or other characteristic as the result of a module analysis. The SMAS may also apply rules such as "the product name is incorporated into the name of the library or directory the module is located."

The resultant product-identified inventory may be stored in a separate database or incorporated into the knowledge base.

The SMAS also correlates usage data against the KB or against the product-identified inventory data to determine what product each executed module belongs to.

Through such processing, an SMAS is able to provide users with information organized in a number of different views, such as:

module inventory, by system, by library
product inventory, by system, by library
module usage, by time period, by system, by library
product usage, by time period, by system, by library
product usage, by product version and release, by time period, by system, by library
product usage, by time period, by system, by library, by user ID
product usage, by product version and release, by time period, by system, by library, by user ID
product usage, by time period, by user ID, by system, by library
product usage, by product version and release, by time period, by user ID, by system, by library
user activity, by time period, by product, by system
product usage by job or job-step
user activity, by product, by time period, by system While usage data is generated on computer systems that are the subject of the auditing activity, it is often desirable to allow the users of an SMAS to review the data, including the above views, on a desktop PC, separate and apart from the one where the auditing activity takes place. One approach to achieving this is to simply transfer the usage data, as it is collected or periodically, to a personal computer. Another approach is to provide remote access to this data from a PC. But because of the extreme volume of data, these approaches may not be practical—it may take too long to transfer (if done electronically, by downloading), or may take up more disk memory than is available on the PC, or may represent more data than can practically be processed on a desktop computer. Moreover, the overhead and duration of performing the necessary processing and analysis of the gathered usage data, whether the processing is done on a PC or a mainframe, is proportional to the quantity of data processed, and can often be burdensome.

SUMMARY OF THE INVENTION

It is an object of the present invention to minimize the overall amount of auditing data that must be collected and/or retained, whether on the mainframe or elsewhere.

It is a further object of the present invention to minimize the amount of data that must be transferred to the PC, while still permitting the ability to view all relevant inventory and usage data.

It is a further object of the present invention to minimize the amount of processing and data-movement that must be performed when a particular view is requested in order to produce that view.

The foregoing and other objects of the invention are realized by the system and method of the present invention which incorporates into a conventional SMAS a reducer software component which processes the detailed usage data gathered by the monitor of the SMAS. The reducer condenses the gathered information in one or more ways and creates a condensed usage database (CUDB). The data in the CUDB is organized in a number of ways according to the needs of the user.

In one aspect thereof, the reducer is able to condense gathered information by converting data records, such as records concerning the ongoing execution of load modules, in an "on the fly" fashion, i.e., substantially contemporaneously with the execution of such load modules. Stated another way, the processing of load module usage data records proceeds in a substantially ongoing basis, rather than awaiting an entire day, a week or a month before processing of data is carried out, as in the prior art.

In accordance with one embodiment thereof, the present invention is able to dispense with the need to process information regarding many load module executions by resorting to the processing of substantially only entry-gate load modules, i.e., load modules that are indicative of the initiation of the use of specific software products. The invention also includes a system and method for identifying such entry-gate load modules.

Other features and advantages of the present invention will become apparent from the following description of the invention which refers to the accompanying drawings.

DETAILED DESCRIPTION OF THE INVENTION

Figure 1:
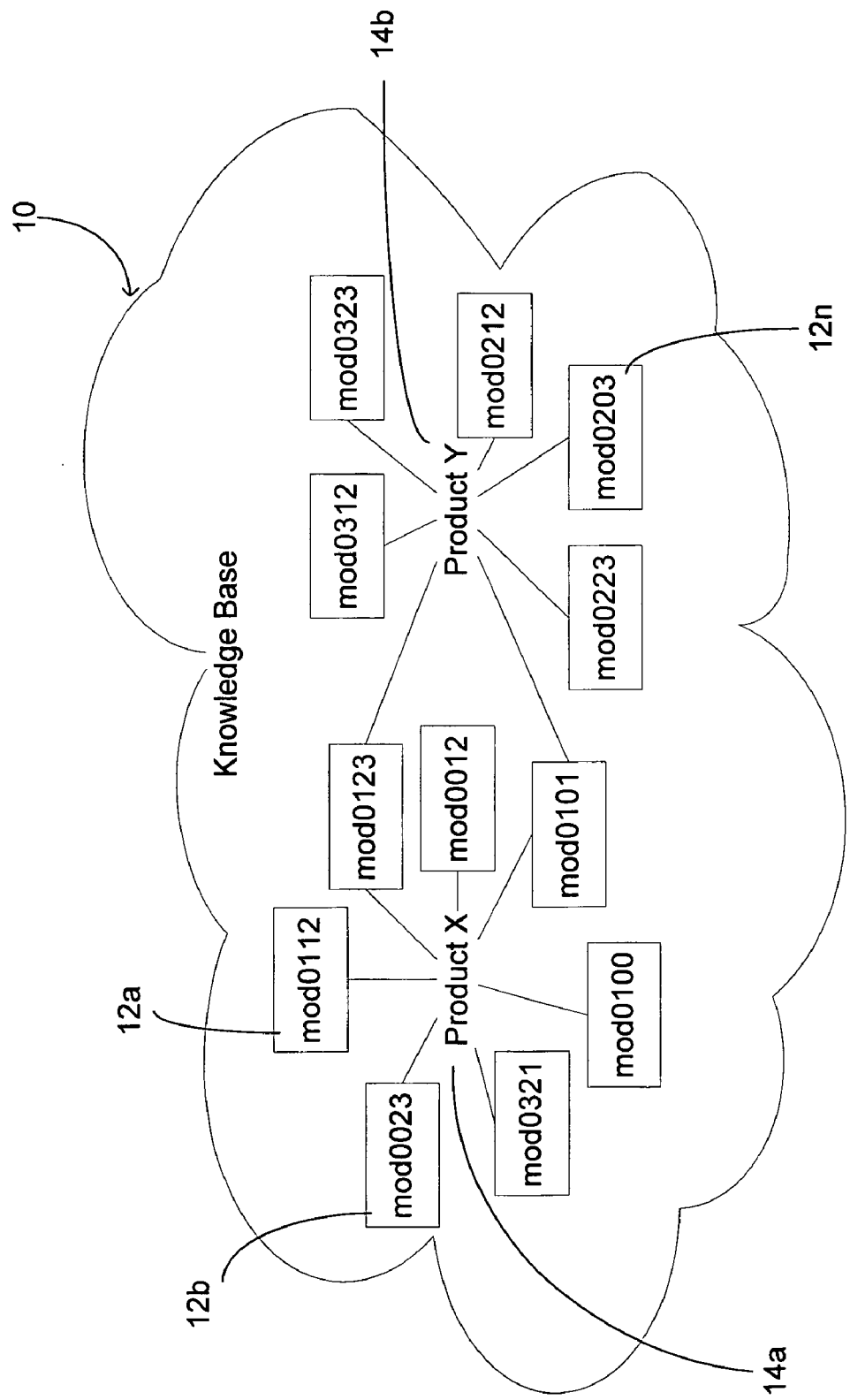
FIG. 1 diagrammatically illustrates the software product knowledge base.

Hereinafter, the term "user ID" is intended to more generally refer to one or more of: user name, system user ID, jobname, security group name, process ID, or other applicable system accounting field that is a means of identifying a user or group of users.

The term "module" is meant to include executable software programs, executable script files, and interpreted programming languages such as JAVA and BASIC.

The Reducer: The Reducer processes the detailed usage data gathered by the Monitor. It condenses it in one or more ways and creates a Condensed Usage Database (CUDB). The data in the CUDB can be organized in a number of ways according to the needs of the user.

Generally, the Reducer processes usage data according to controls set by the user. These controls, among other things, determine the granularity of the condensed data ranging from gathering all usage data available, condensing portions of the data, or excluding some or all of the data. Other controls may apply various types of filters to limit the scope of the condensed data. But the invention may also operate without user intervention, using default settings.

Ultimately, the concern of users of an SMAS is which software products have been executed. Typically, they are not concerned with knowing exactly which modules have been executed. Therefore, to the user, there is not a meaningful distinction between a process that executes 100 different modules, each belonging to a particular product, and another process that executes only a single module belonging to the product—each has executed or used the product. The Reducer eliminates this redundant, module based data, in accordance with several embodiments thereof.

1. In one embodiment, the Reducer resolves each module used by reference to a unit of work, e.g. a particular process such as a job step, or to the product it belongs to, either by looking them up in the KB; or in the product-identified inventory; or in an extract from either of these sources. If one or more data records in the detailed data associated with a particular process pertain to modules that belong to a single product, whether those modules resided on the same library, directories, storage devices or different ones, those records are replaced by a single record in the CUDB that specifies only usage data associated to the product-name correlated with the active process. Thereafter, the condensed data contains only product-level information, replacing all module-level information with at most one record per "unit of work" (e.g., job, job-step, etc.) for each product executed by that job-step. Optionally, the identity of the library containing the product's executed modules is retained, resulting in one record per job-step for each unique product/library combination.

2. In another embodiment, the Reducer condenses usage information pertaining to job steps (a job may be comprised of many independent steps, each executed serially and/or in parallel), keeping track only of the overall data for the entire job. Thus, if a given module, on a given library, is executed several times (or a given product, if the data was also subject to the reduction procedure described in paragraph 1), by several different steps within a single job, which the Monitor will have recorded as separate detail records, the Reducer replaces these multiple detail records with a single record, indicating consolidated usage data for the module (or product) used within the job.

3. In another embodiment, the Reducer condenses usage information according to a user selectable time interval (for example, hourly, daily or weekly). The Reducer discards user ID, job and job-step information while keeping track only of those modules (or products, if module to product reduction as described in paragraph 1 is also employed) that are used during each time interval and representing all such instances of use with a single record. Optionally, user ID information is retained: modules (or products) used during the time interval by distinct user IDs would be recorded as separate records rather than all such use being subsumed into a single record. In another option, for a user-selected number of distinct user IDs, the Reducer retains user ID information as separate records but discards user ID information for all other user IDs and condenses that usage data into a single record.

4. In another embodiment, the Reducer filters out and discards certain data. For example, it may be known that only certain products are of interest, allowing the Reducer to discard all records pertaining to other products, or to modules belonging to other products.

Conversely, it may be known that certain products are not of interest, and only they are discarded. For example, the user can specify to the Reducer to ignore certain products and/or modules that are routinely invoked by other software products or the operating system. As another example, filtering can be performed based on library, in which case the Reducer discards data pertaining to modules or products residing on other than specified libraries, or alternatively the data pertaining to specified libraries is discarded.

In either situation, filtering can be applied according to one or more of the following methods:

- accounting fields. Retain data associated with a specified value of a specific accounting field (user ID, jobname, security group name, etc.) or selected set of accounting fields. For example, data pertaining to specific user IDs may be included or discarded.
- the module name and/or module name patterns. For example, exclude specific modules or all modules whose names are eight characters long and are of the form IEFxxxxx, where 'x' is any character, which are used throughout the IBM OS/390 operating system and are of little interest when auditing. Additionally, a pattern, (i.e., a regular expression) can be established for filtering according to module names. In some software programs, "IEF[[:alnum:]]+" is a regular expression for the preceding example.
- the time of day. For example, exclude all data except that collected from 10:00 AM to 11:00 AM.
- the days of the week.
- the date, For example, exclude all data prior to Apr. 1, 1999, or include only data between Nov. 1, 1999 and Nov. 15, 1999.

5. In another embodiment, the Reducer records only usage data pertaining to "entry gate" modules, discarding all other data. (Of the dozens, or hundreds, or thousands of modules that might comprise a particular software product, an entry gate module is one of those relatively few modules that is executed to begin use of the product, and which in turn invokes other subordinate modules as required.) So long as data pertaining to any of a product's entry gate modules is retained by the Reducer, determination of product usage will be accurate whether product resolution is performed within the Reducer itself, or by a subsequent process. Furthermore, the Reducer is still capable of filtering out and discarding all information pertaining to modules other than the entry gate modules. In a preferred embodiment, the Reducer uses a table, database or file containing a list of all entry gate modules for all products of interest. The Reducer discards information about any module that is not contained in the list.

6. In another embodiment, the Reducer discards all usage data pertaining to "non-entry-gate" modules, retaining all other data. The Reducer uses a table, database or file containing a list of non-entry-gate modules and only discards information about those modules contained in the list. This is similar to the above approach of relying on a list of entry gate modules, and retaining information only for those modules, but it has the advantage of being more forgiving. If, using the method of paragraph 5, a list of entry gate modules were to be incomplete, software products could be executed via the missing modules without the Reducer retaining appropriate information. But, in the present embodiment, if some non-entry-gate modules are missing from the list, the consequence is only that the Reducer retains information for them, which is at worst redundant.

7. In another embodiment, the Reducer discards all usage data pertaining to "non-entry-gate" modules, as described in paragraph 6, condensing all other data using one or more of the methods described above.

Figure 2:
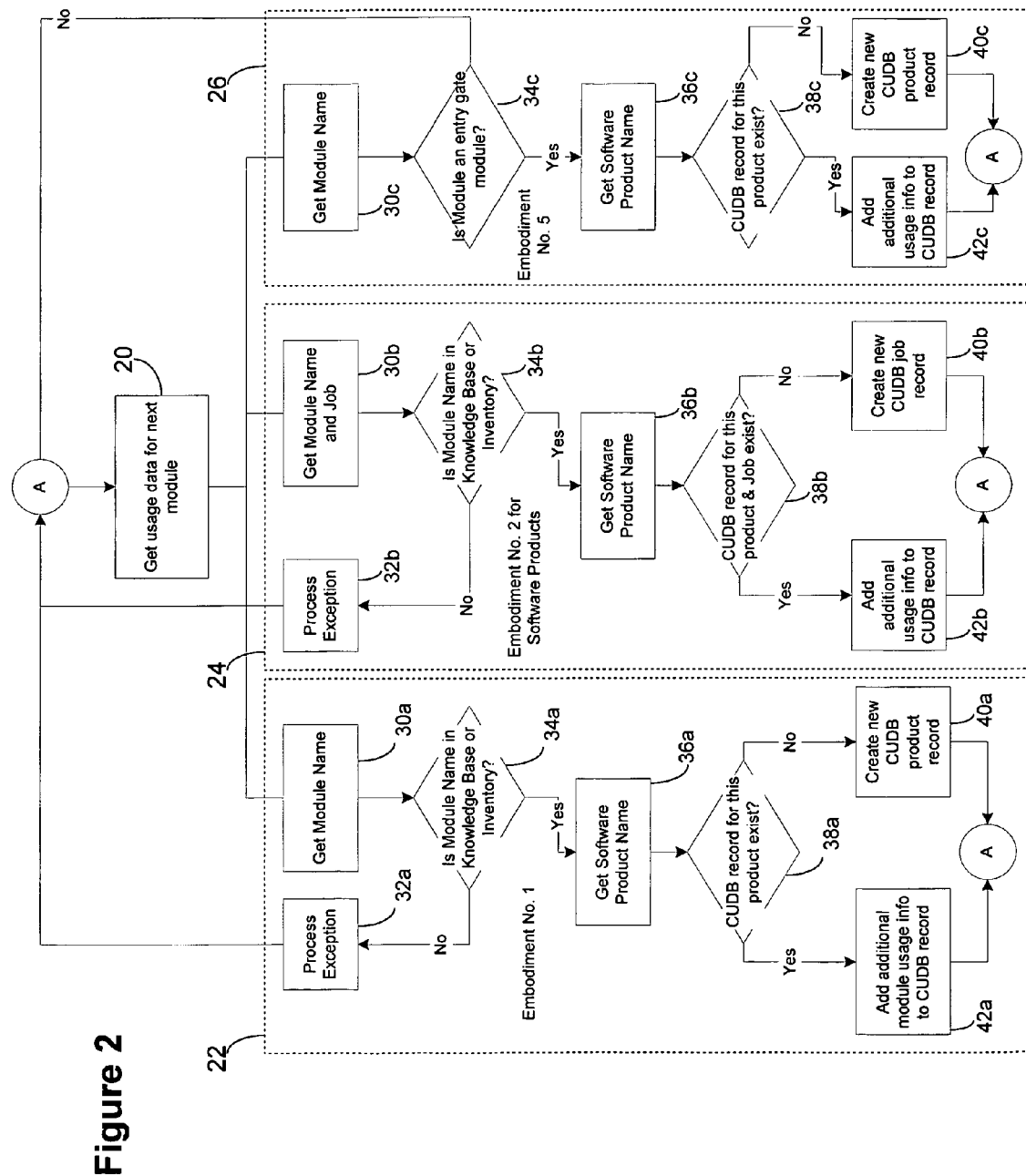
FIG. 2 is a process flow diagram for several different embodiments of the present invention.

For illustrative purposes, FIG. 2 presents the process flow for the methods expounded in paragraphs 1, 2 and 5, which are designated in the figures by reference numerals 22, 24 and 26, respectively. The three methods or processes follow the same general pattern. In each, the method obtains the usage data for the next module at step 20 and follows up by obtaining either module name or module name and job as indicated for the respective processes by reference numerals 30a, 30b, and 30c. Steps 34a, 34b, and 34c determine whether the retrieved module name is in the knowledge base or an entry gate module (for process 26). Exceptions, i.e., non-routine records, are handled by the process exception step 32a, 32b. Otherwise, the program proceeds to get the software product name at steps 36a, 36b and 36c. The respective steps 38a, 38b and 38c determine whether there is a condensed usage database record for the particular product. If yes, steps 42a, 42b and 42c add an additional record to the CUDB. Otherwise, a new CUDB product record is created as noted by reference numerals 40a, 40b and 40c.

Above, an embodiment has been described wherein entry-gate module records are used for data reduction. To this end, the Reducer uses a look-up table of entry-gate modules, correlated to software product names, to determine when a given software product is first invoked. The invention automatically determines whether a module is an entry-gate module, using an entry-gate lookup table (ELT) and the Knowledge Base or the product-identified inventory lookup table (PLT).

Figure 3:
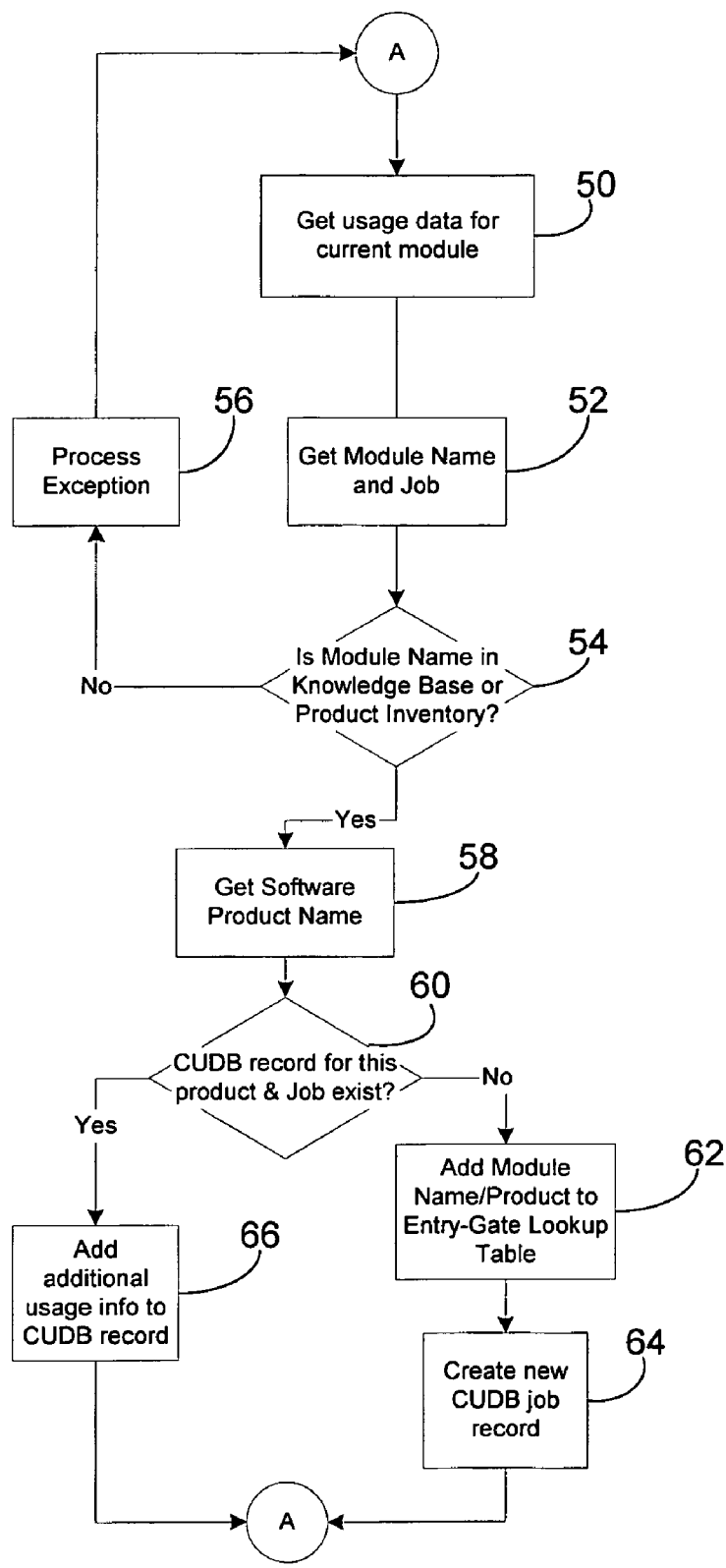
FIG. 3 is a process flow diagram for an embodiment of the invention which effects data reduction based on operating with entry-gate modules.

With reference to FIG. 3, initially, the entry-gate lookup table (ELT) is empty or at most manually populated with records listing known entry-gate module names correlated to software product names. As such, the Reducer, as already described in a first step resolves the names of executed modules to the software product using Knowledge Base or, as is more likely, the product-identified inventory lookup table (PLT).

As a variation, whenever the execution of a module is detected by the Monitor, the Reducer looks up the name of that module in the PLT. If a corresponding product name is found, the Reducer then determines if that product is executing for the current job or job-step. As shown in FIG. 3, the product is executing if a record for that product and job already exists in the CUDB. If it is not executing, the current module is an entry-gate module to the product and a corresponding entry is made in the ELT.

After a period of time, most if not all of the entry-gate modules for the installed software products will have been identified and that information stored in the ELT. Thereafter, the Reducer, in subsequent operation, can use the much smaller ELT in place of the PLT to collect product usage data in accordance with the methods previously described. Moreover, the information in the ELT may be transferred to other computers and user installations, obviating the need to populate the ELT from scratch on those systems.

The pattern of the process in FIG. 3 starts with the acquisition of usage data for the currently executing load module (at step 50) followed by obtaining the module name and job identification at step 52. Decision step 54 determines whether the module name is in the Knowledge Base or product-identified inventory file followed by obtaining (at step 58) the software product name, except when it is not available whereupon a "process exception" is undertaken at step 56. After the product name has been obtained, the step 60 determines whether the condensed usage database (CUDB) has a record for this product and job. If so, the additional information is added to the record at step 66. Otherwise, the module name is added to the entry-gate lookup table at step 62 and a new condensed usage database job record is created at step 64.

In another embodiment, the Reducer processes data produced by an SMAS to identify entry-gate modules. A typical SMAS correlates usage data against the Knowledge Base and/or the product-identified inventory to determine what product each executed module belongs to. If the data does not already contain a timestamp indicative of when each module executed, the Monitor program of the SMAS is enhanced to do so. Various techniques can be used by the Reducer to analyze this data such as sorting the data in a table first by product and process, then by module name and finally by time. For each process, the first record for each product (representing the first module belonging to the product that was used by the process) is the entry-gate module which is entered in the ELT.

The Reducer may be implemented in a number of ways:
- as a separate program, such as a batch program, that processes the data produced and recorded on media by the Monitor and creates the CUDB.
- as part of the Monitor, processing the detailed data when the execution of the module is detected and before the Monitor ever records the detailed data to media, thereby saving overhead by recording only condensed data.
- the functions of the Reducer could be split into separate processing steps, with some functions being performed within the Monitor while others are performed in a subsequent step.

The Reducer may also operate on the data produced by multiple instances of the Monitor, running on multiple LPARs or partitions of a single computer, or on multiple computers. Any of the three reduction methods above can be performed, either retaining, or optionally collapsing and discarding, information as to the identity of the LPAR or computer on which the data was originally collected. Of course, the Reducer, as understood by one of skill in the art, consists of many software sections, components, routines, modules, data files, etc. It inherently includes control software, interface software, data condensing routines and the like.

As described above, the Reducer of the present invention achieves the objective of reducing the amount of information that needs to be gathered by a monitor to a mere fraction of that required in the prior art. For example, in a typical mainframe computer setting, where the ratio of modules to products is 1,000, the approach of the invention, which records product rather than module usage, produces a data reduction of at least 100 fold and often as high as 1,000 or even greater. This of course means that the amount of data that needs to be retained within the mainframe and subsequently transferred to a PC or another device, is similarly $100^{th}$ or even $1,000^{th}$ of the typical amount that needs to be transmitted when practicing the prior art. The invention enhances such products as Isogon's SoftAudit system by no longer requiring to provide massive amounts of off line storage for storing usage information over periods which typically exceed six weeks.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A computer monitor for monitoring execution of software products on a computer, the monitor comprising:
   monitoring software that monitors the execution of load modules on a computer; and
   a reducer that contemporaneously condenses and converts data records reflecting the execution of the load modules to data records which reflect usage of products on the computer.

2. The computer monitor of claim 1, in which the reducer includes condenser software that resolves the execution of load modules based on a criteria comprising one or more of: job; job-step; user IDs; entry-gate module; time periods; product identities; accounting fields and module name patterns.

3. The computer monitor of claim 2, in which the criteria comprises product identities.

4. The computer monitor of claim 2, in which the criteria comprises one or more of: user name, system user ID, job name, security group name and process ID.

5. The computer monitor of claim 2, in which the reducer comprises a separate program that processes data produced and recorded on media by the monitor, to create a condensed usage database.

6. The computer monitor of claim 1, further including a knowledge base listing an inventory of load modules in the computer and the reducer including software which reduces accumulation of load module data by reference to one or more of: job step, or product-identified inventory, or an extract from job steps and product-identified inventory.

7. The computer monitor of claim 1, in which the reducer operates to retain only product-level information.

8. The computer monitor of claim 7, in which the product-level information is further classified in accordance with product/library criteria.

9. The computer monitor of claim 1, in which the reducer operates to retain only module usage information in accordance with a unit of work.

10. The computer monitor of claim 1, in which the reducer includes condensing software which condenses usage information according to a user selectable time interval.

11. The computer monitor of claim 1, in which the reducer contains software that instructs the reducer to avoid applying its reduction function to predetermined software products.

12. The computer monitor of claim 1, in which the reducer contains software that instructs the reducer to discard usage information pertaining to predetermined software products.

13. The computer monitor of claim 1, in which the reducer contains software that instructs the reducer to apply its reduction function to predetermined software products only.

14. The computer monitor of claim 1, in which the reducer provides a filtering function which is based on one or more parameters selected from a group: accounting fields, module names, module name patterns, time of day, day of week and date.

15. The computer monitoring of claim 1, in which the reducer maintains a list of entry gate modules and only retains data which reflects usage of entry gate modules.

16. The computer monitor of claim 1, in which the reducer maintains a list of non-entry gate load modules and includes software which discards only usage information pertaining to non-entry gate load modules.

17. The computer monitor of claim 1, in which the reducer comprises a portion of the monitor and operates by processing data before the monitor records detailed data to a computer storage medium for longer than temporary recording.

18. The computer monitor of claim 1, in which the monitor runs on multiple logical partitions and the reducer operates on data produced by multiple monitors running on different logical partitions.

19. The computer monitor of claim 1, further comprising an interface for transferring information produced by the reducer to a PC-type computer which is located remotely relative to the computer being monitored.

20. The computer monitor of claim 1, in which the reducer contemporaneously converts the data records in a manner which reduces an amount of data records by at least a factor of 100 to 1 over a monitoring period that is greater than at least one week.

21. A method of monitoring execution of software products on a computer and producing reduced data records reflecting such execution, the method comprising the steps of:
 monitoring the execution of load modules on a computer;
 providing a reducer which contemporaneously condenses and converts data records reflecting the execution of load modules to data records which reflect usage of products on the computer.

22. The method of claim 21, further including resolving the execution of load modules based on a criteria comprising one or more of: job; job-step; user IDs; entry-gate module; time periods; product identities; accounting fields and module name patterns.

23. The method of claim 22, including resolving the execution of load modules to product identities.

24. The method of claim 22, in which the criteria comprises one or more of: user name, system user ID, job name, security group name and process ID.

25. The method of claim 21, including listing an inventory of load modules in the computer in a knowledge base and reducing accumulation of load module data by reference to one or more of: job step, work product-identified inventory, or an abstract from job step and product-identified inventory.

26. The method of claim 21, including operating a reduction process that retains only product-level information.

27. The method of claim 21, including operating a reduction process that retains only module usage information resolved to units of work.

28. The method of claim 21, including condensing usage information according to a user selectable time interval.

29. The method of claim 21, including operating the reducer to avoid applying its reduction function to predetermined software products.

30. The method of claim 21, including operating the reducer to discard usage information pertaining to predetermined software products.

31. The method of claim 21, including operating the reducer to apply its reduction function to predetermined software products only.

32. The method of claim 21, including filtering information obtained from monitoring execution of load modules based on one or more parameters selected from a group: accounting fields, modules names, module name patterns, time of day, day of week and date.

33. The method of claim 21, including maintaining a list of entry gate modules and only retaining data which reflects the usage of entry gate modules.

34. The method of claim 21, including maintaining a list of non-entry gate load modules and discarding usage information pertaining to non-entry gate modules.

35. The method of claim 21, further including providing an interface and transferring information, via said interface, produced by the reducer to a PC-type computer which is located remotely relative to the computer being monitored.

36. The method of claim 21, in which the reducer contemporaneously converts the data records in a manner which reduces an amount of data records by at least a factor of 100 to 1 over a monitoring period that is greater than at least one week.

37. A computer monitor for monitoring execution of software products on a computer, the monitor comprising:
 monitoring software that monitors the execution of load modules on a computer;
 a table that stores a list of entry-gate load modules; and
 a reducer that condenses and converts data records reflecting the execution of software products on the computer substantially only by reference to the entry-gate load modules stored in the table.

38. The computer monitor of claim 37, in which the reducer only retains data which reflects the usage of entry-gate modules.

39. The computer monitor of claim 37, in which the reducer maintains a list of non-entry gate load modules and includes software which discards only usage information pertaining to non-entry gate load modules.

40. The computer monitor of claim 37, in which the reducer includes software for automatically determining an identity of entry-gate load modules and for storing such entry-gate load modules in the table.

41. The computer monitor of claim 40, in which the reducer includes software for counting a number of times software products are being executed, by reference to a criteria comprising one or more of: job; job-step; user IDs; entry-gate modules; time periods; product identities; accounting fields; and module name patterns.

42. A method of monitoring execution of software products on a computer, the method comprising the steps of:
 monitoring the execution of load modules on a computer;
 storing a list of entry-gate load modules in a table; and
 a reducer that condenses and converts data records reflecting the execution of software products on the computer substantially only by reference to the entry-gate load modules stored in the table.

43. The method of claim 42, including retaining data which reflects the usage of only entry-gate modules.

44. The method of claim 42, including maintaining a list of non-entry gate load modules and discarding only usage information pertaining to non-entry gate load modules.

45. The method of claim 42, including automatically determining an identity of entry-gate load modules and storing such entry-gate load modules in the table.

46. The computer monitor of claim 45, including counting a number of times software products are being executed, by reference to a criteria comprising one or more of: job; job-step; user IDs; entry-gate modules; time periods; product identities; accounting fields; and module name patterns.

* * * * *